US008267434B2

(12) United States Patent  (10) Patent No.: US 8,267,434 B2
Engdahl  (45) Date of Patent: Sep. 18, 2012

(54) HOSE COUPLING PROVIDED WITH NON RETURN VALVE AND A COMBINED LOCKING AND OBSTRUCTING BODY

(75) Inventor: Björn Engdahl, Göteborg (SE)

(73) Assignee: Cejn Aktiebolag (SE)

( * ) Notice: Subject to any disclaimer, the term of this patent is extended or adjusted under 35 U.S.C. 154(b) by 556 days.

(21) Appl. No.: 11/989,235

(22) PCT Filed: May 22, 2006

(86) PCT No.: PCT/SE2006/000590
§ 371 (c)(1),
(2), (4) Date: Apr. 14, 2008

(87) PCT Pub. No.: WO2006/126936
PCT Pub. Date: Nov. 30, 2006

(65) Prior Publication Data
US 2009/0146421 A1    Jun. 11, 2009

(30) Foreign Application Priority Data

May 23, 2005   (SE) ........................................ 0501143

(51) Int. Cl.
*F16L 37/18* (2006.01)
(52) U.S. Cl. .................................. 285/316; 137/614.05
(58) Field of Classification Search .................. 285/313, 285/86, 924, 314, 316; 137/614.05
See application file for complete search history.

(56) References Cited

U.S. PATENT DOCUMENTS

| 2,888,278 | A | * | 5/1959 | Torres et al. ................. 285/313 |
| 2,952,482 | A | * | 9/1960 | Torres ........................... 285/313 |
| 4,366,945 | A | * | 1/1983 | Blauenstein .............. 251/149.6 |
| 4,483,510 | A | * | 11/1984 | Palau et al. ................. 251/149.6 |
| 4,703,958 | A | * | 11/1987 | Fremy .......................... 285/316 |
| 4,982,761 | A | * | 1/1991 | Kreczko et al. .......... 137/614.03 |
| 5,547,166 | A | * | 8/1996 | Engdahl ..................... 251/149.6 |
| 5,630,570 | A | * | 5/1997 | Lacroix et al. ............. 251/149.9 |
| 5,806,832 | A | * | 9/1998 | Larbuisson ................ 251/149.6 |
| 5,984,265 | A | * | 11/1999 | Engdahl ......................... 251/148 |
| 6,767,034 | B2 | * | 7/2004 | Le Clinche ................... 285/319 |
| 6,840,548 | B2 | * | 1/2005 | Lacroix ......................... 285/308 |
| 6,926,312 | B2 | * | 8/2005 | Lacroix et al. ................ 285/317 |
| 7,431,346 | B2 | * | 10/2008 | Frost et al. .................... 285/317 |
| 7,452,006 | B2 | * | 11/2008 | Kohda .......................... 285/316 |
| 7,497,231 | B2 | * | 3/2009 | Sasa ........................ 137/614.06 |

FOREIGN PATENT DOCUMENTS

| EP | 1033522 | 6/2004 |
| SE | 506302 | 12/1997 |
| WO | WO 97/47911 | 12/1997 |

* cited by examiner

*Primary Examiner* — Aaron Dunwoody
(74) *Attorney, Agent, or Firm* — Schwegman Lundberg & Woessner, P.A.

(57) ABSTRACT

Hose coupling incorporates male part and a female part being provided with elements which in corporation with a slide axially displaceable sleeve on the female part renders possible pressure relief at disconnection. These elements are constituted by an angular locking pawl one portion of which is insert able in an axial groove in the female part and has such length that always at least some part thereof is surrounded by the sleeve. The other inwardly directed part of the locking pawl has such length that it extends into the groove of the male part when locking pawl is influenced by the sleeve. The locking pawl is a combined element. To lock the male part when the coupling is connected and lock the male part in an alternative position when it's pressure relieved.

3 Claims, 3 Drawing Sheets

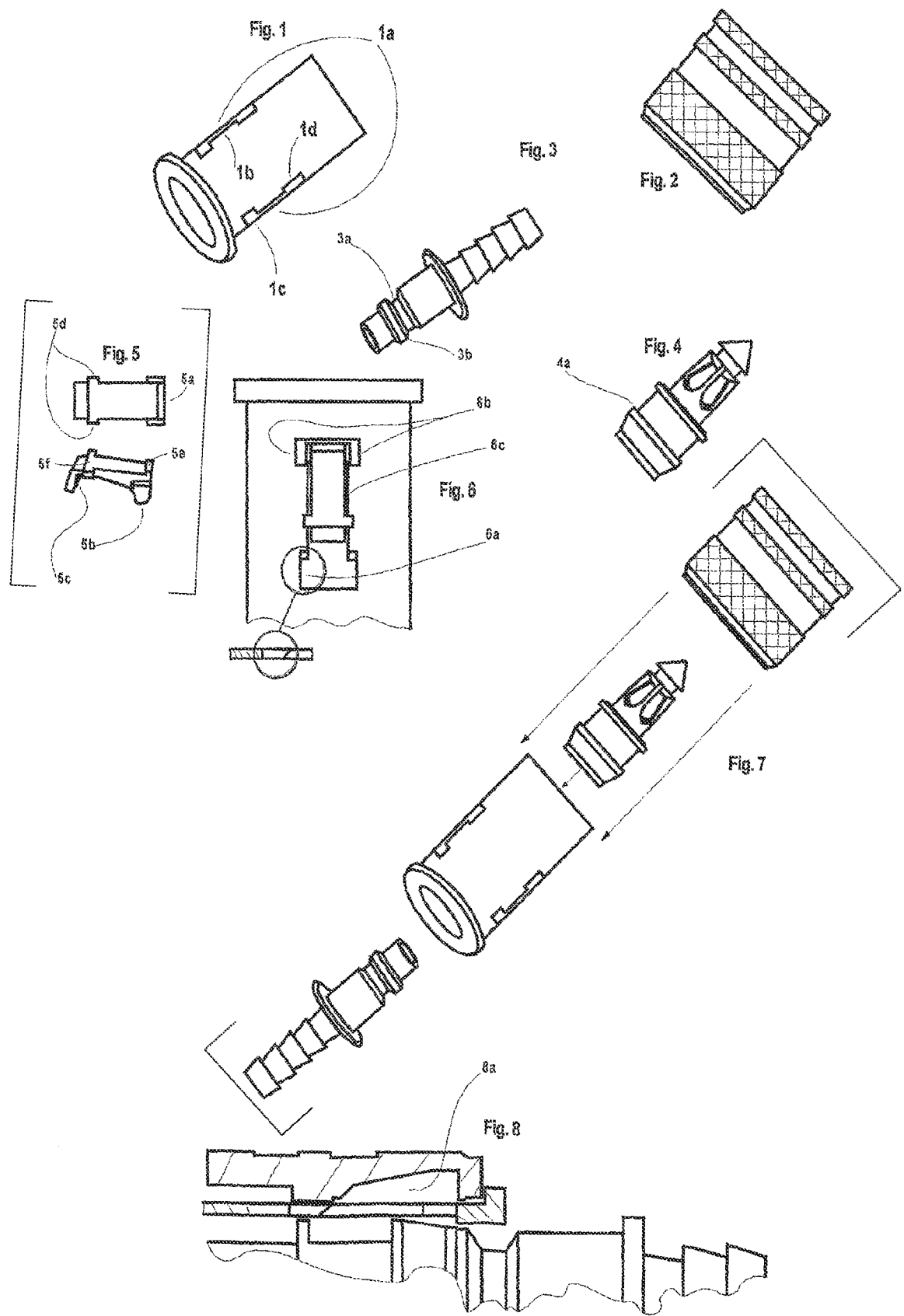

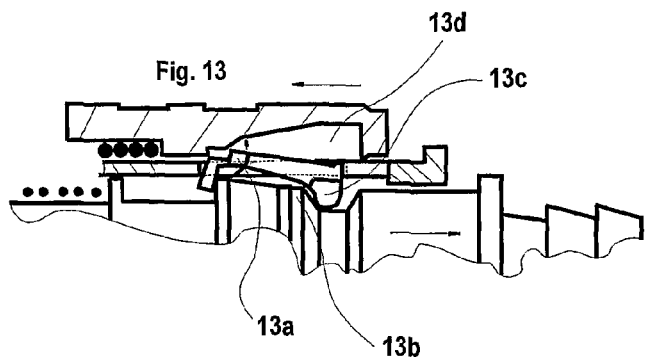
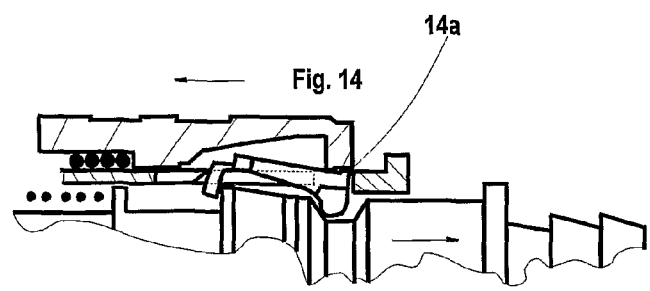
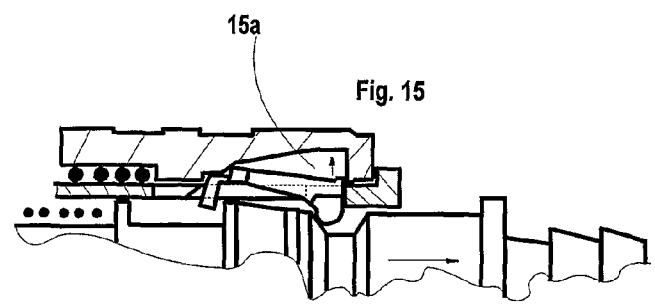
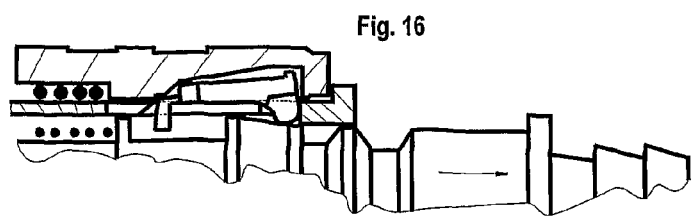

HOSE COUPLING PROVIDED WITH NON RETURN VALVE AND A COMBINED LOCKING AND OBSTRUCTING BODY

BACKGROUND OF THE INVENTION

Quick couplings with pressure relief function was presented in a first patent SE 470 452 B and in a later patent SE 506 302 C2. Both of these patents describe a quick coupling for compressed air with no recoil and disturbing noise when disconnecting, it's all eliminated. This is an unpleasant characteristic for ordinary couplings without pressure relief function.

BRIEF SUMMARY OF THE INVENTION

The invention of these couplings contains locking bodies and locking pawls which is referring to above patent. The function of these couplings is to stop the male part (FIG. 3), the nipple in intermediate positions until the pressure reliefs in the nipple have entirely or partly dropped down. The nipple sets free automatically or with a light press on the nipple. In these both referring patent, the coupling is provided with at least four locking bodies which interacting in pairs. The two pairs of locking bodies have two different functions in a coupling with pressure relief function. One of the pair of the locking bodies will lock the nipple when the coupling is connected. The other pair of locking bodies will lock the nipple in a pressure relief position.

This application as follows describes a combined locking pawl of these two different locking bodies as describes earlier. That means you only have to have one pair of locking pawls instead of have two pairs of locking bodies to achieve the same function.

1. Since you only need to do two grooves in the female part instead of four, the strength increases radically.
2. To combine the two pairs of locking bodies to one pair of locking pawls it's possible to increase the strength of these locking pawls, you can make them bigger.
3. An easier and faster manufacturing because of fewer components and less processing of the details.
4. To have only one pair of locking pawls instead of two, there will be fewer components in the coupling and the reliability of the coupling will increase too.

BRIEF DESCRPTION OF THE DRAWININGS

The invention will be more detailed described in the following text referring to the attached drawings.

Figure 9:
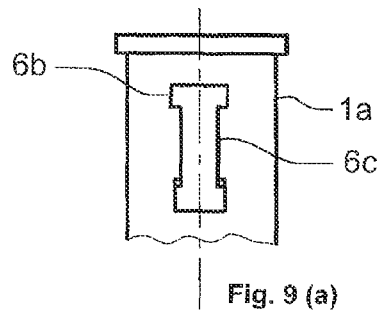
Figure 9:
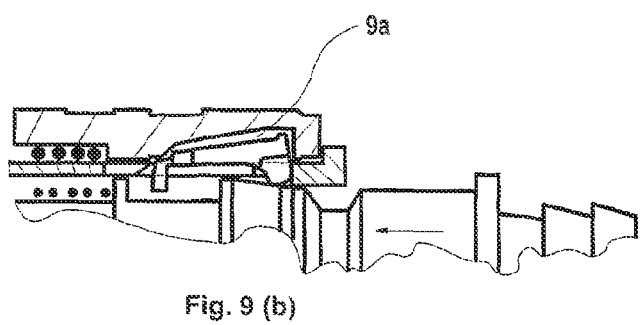
Figure 10:
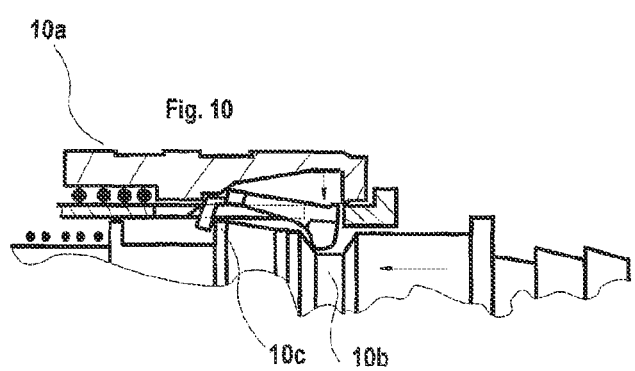
Figure 11:
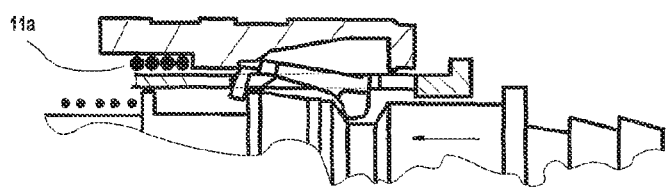
Figure 12:
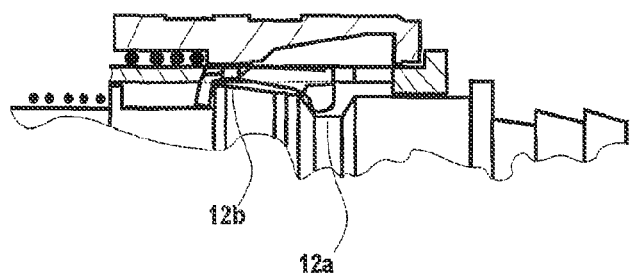

FIG. 1. Shows the female part 1a.
FIG. 2 Shows the spring-loaded sleeve.
FIG. 3 Shows the nipple 3b.
FIG. 4 Shows the non-return valve
FIG. 5 Shows a combined locking pawl of two different locking bodies.
FIG. 6 Shows a female part with an axial slot 6c for a locking pawl.
FIG. 7 Shows the interacting components without the locking pawls.
FIG. 8 Shows a longitudinal section of the coupling and the nipple.
FIG. 9a shows the female part 1a and FIG. 9b Shows the locking pawl when the coupling is disconnected.
FIG. 10 Shows the locking pawl when the nipple 3b is entering the female part 1a.
FIG. 11 Shows the locking pawl when the nipple 3b has almost reached its locking position.
FIG. 12 Shows the locking pawl when the nipple 3b is in the locking position.
FIG. 13 Shows the locking pawl during the disconnection of the nipple from the locking position.
FIG. 14 Shows the locking pawl in a pressure relief position.
FIG. 15 Shows the locking pawl in a disconnecting position.
FIG. 16 Shows the locking pawl in disconnected position.
FIG. 10 illustrates inserting the nipple into the female part at which the fore part of the locking pawl (5a in FIG. 5) goes down into the T-shaped groove (6b in FIG. 6, 1c in FIG. 1) adjusted for the locking pawl in the female part. Since the circumferential groove 3a in the nipple (3b in FIG. 3) offers space for the locking pawl to glide down.

When the nipple is pushed further into the female part, the locking pawl 5c comes into a interacting position with the nipple because of the narrowing axial slot (6c in FIG. 6) in the female part forcing down the fore part wings 5b of the locking pawl into a circumferential groove 10b in the nipple 3b (see FIG. 10). The locking pawl will also bring the spring-loaded 11a sleeve 10a backwards (FIG. 11) as the nipple is pushed further into the female part.

As when the locking pawls back wings (5f, 5d in FIG. 5) have reached the adjusted T-shaped groove 6a (1d in FIG. 1) in the female part (FIG. 6) and has fallen down into the groove (4a in FIG. 4), and the spring-loaded sleeve 10a has been forced back over the locking pawl to its origin position (FIG. 12) and locked the nipple in a locked and connected position.

To start the pressure relief function the spring-loaded sleeve is pushed backwards (FIG. 13), the internal circumferential groove in the sleeve (9a in FIG. 9(b), 13d in FIG. 13) allows the locking pawl to go out of the locking position (13a in FIG. 13) and glide to a pressure relief position. When the spring-loaded sleeve is pushed back and the locking pawl is out in a pressure relief position (FIG. 14). The sleeves forces internal ring (14a in FIG. 14), to lock the locking pawl into the circumferential groove in the nipple in the pressure relief position. To disconnect the nipple from the female part, just bring a light push to the nipple and the spring-loaded sleeve will return back to its forward position (FIG. 15). And locking pawls offers space out in the internal circumferential groove (15a in FIG. 15) in the spring loaded sleeve and thereby the nipple will be fully released from the female part (FIG. 16).

By shaping the female part, as described above its possible with just one kind of locking pawl to achieve the two different locking positions of the nipple, in a locked and connected position, and in a pressure relief position.

These two kind of locking positions were not able without two kinds of locking bodies before. There for you will increase the strength of the female part because there will only be two grooves instead of four, and the locking pawl could there for be produced in a larger size and thereby with higher strength. There will be a reduction of components and also easier and faster manufacturing.

The invention claimed is:
1. A hose coupling comprising:
a male part including a circumferential groove; and
a female part, the male part being configured to be insertable within the female part, the female part including:
a locking and stop pawl having a proximal detent and a distal detent at opposite ends of the locking and stop pawl; and
a non-return valve configured to control the flow through the coupling;

wherein the female part is surrounded by a spring loaded axially displaceable sleeve, the spring loaded sleeve including:
- an axially extended position, in which the locking and stop pawl is held in engagement, via the distal detent, with the circumferential groove of the male part to fully lock the male part to the female part; and
- an axially retracted position, in which the distal detent of the locking and stop pawl is positioned to obstruct, during uncoupling, the partially withdrawn male part to place the male part in a partially uncoupled position; and wherein the female part includes at least one axially oriented elongated slot configured to cooperate with the locking and stop pawl, the spring loaded sleeve including an oblique interior circumferential surface configured to bring the locking and stop pawl into fully locked engagement with the circumferential groove of the male part upon coupling insertion of the male part and the female part.

2. The hose coupling according to claim 1, wherein the female part includes two diametrically opposite elongated slots, each of the elongated slots including a locking and stop pawl.

3. The hose coupling according to claim 1, wherein the elongated slot is substantially rectangular, the slot including slot end parts and a middle section, the slot end parts being wider than the middle section of the slot, the locking and stop pawl having a portion narrower than the middle section of the slot, the locking and stop pawl having pawl end parts, each pawl end part including a size that exceeds the size of the middle section of the slot but is narrower than the slot end parts.

* * * * *